UNITED STATES PATENT OFFICE.

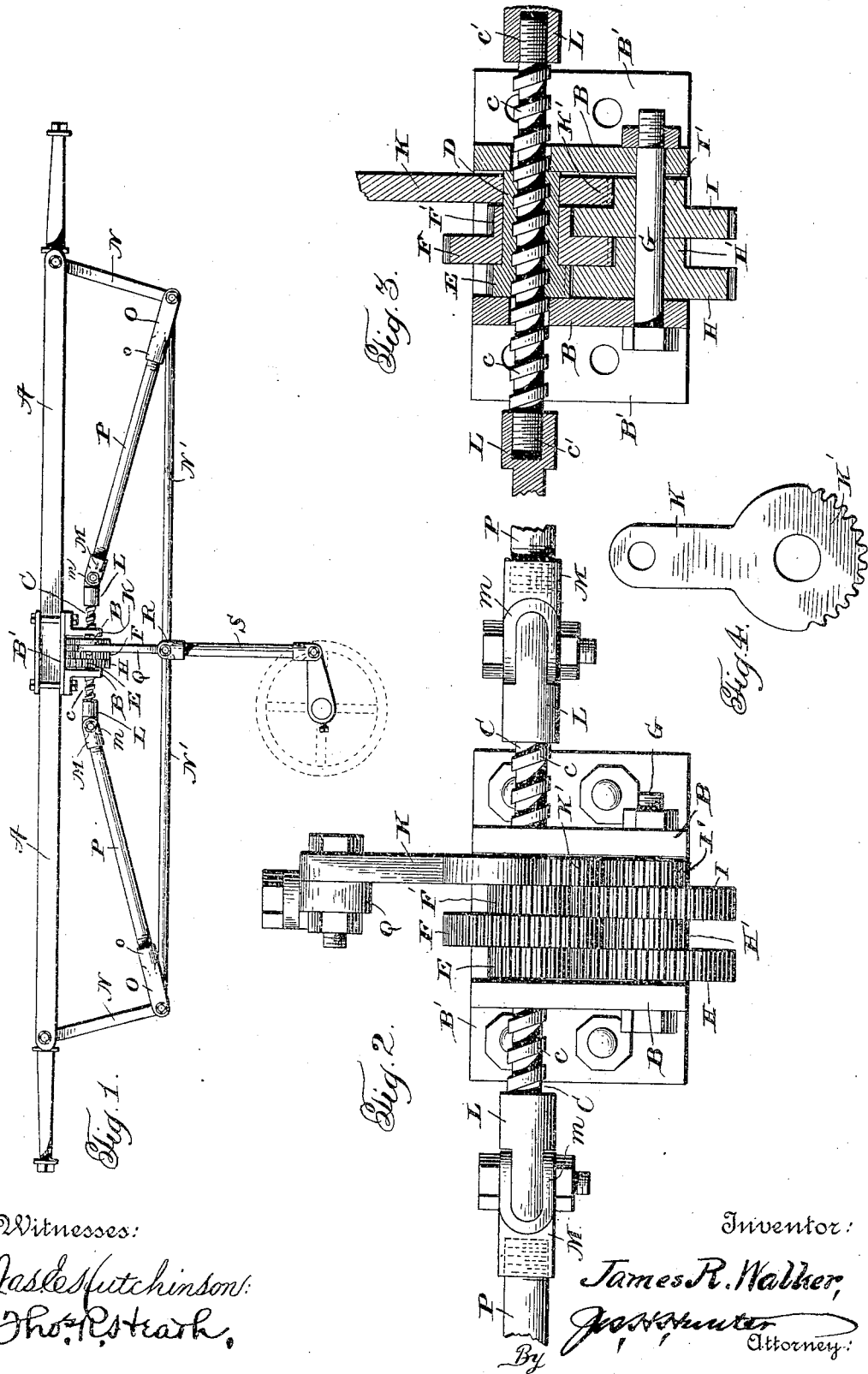

JAMES R. WALKER, OF PINE RIDGE, SOUTH DAKOTA.

STEERING-GEAR.

960,128.  Specification of Letters Patent.  Patented May 31, 1910.

Application filed June 16, 1909. Serial No. 502,543.

*To all whom it may concern:*

Be it known that I, JAMES R. WALKER, a citizen of the United States, residing at Pine Ridge, in the county of Shannon and State of South Dakota, have invented certain new and useful Improvements in Steering-Gears, of which the following is a specification, reference being had therein to the accompanying drawing.

This invention relates to an improvement in steering gear for automobiles or other vehicles and one of the objects of the invention is the provision of a steering gear which will effectually lock the axles of the steering wheels of the automobile or vehicle against movement except when the steering wheel or lever is manipulated to shift the same.

A further object of the invention is the provision of a steering gear of such a construction as to prevent the transmission of shocks and vibrations to the steering wheel or lever.

A further object of the invention is the provision of improved gearing for actuating the steering gear of such a construction that it will require a very slight motion of the steering wheel or lever to change the course in steering as much as is desired.

A further object of the invention is the provision of an improved steering gear provided with means for securing proper adjustment of the several parts thereof to compensate for wear and to permit the steering gear to be properly attached to the vehicle.

A further object of the invention is the provision of a steering gear in which the offset levers of the steering wheels are connected by the usual bar so as to turn together and in which a steering bar is provided, the ends of which are connected by suitable connecting rods with the offset levers of the steering wheels, so that even should one of said connecting rods break or should the connecting rod directly connecting the offset levers of the steering wheels break, the steering gear would still be operative.

Other objects of the invention will be apparent from the detailed description hereinafter when read in connection with the accompanying drawings forming a part hereof, wherein a convenient embodiment of the invention is illustrated and wherein like numerals of reference refer to similar parts in the several views.

In the drawings, Figure 1 is a top plan view of the front axle of a motor vehicle, showing the steering gear applied thereto. Fig. 2 is a side elevation of the screw steering rod and the mechanism for reciprocating the same, and, Fig. 3 is a sectional view of the mechanism shown in Fig. 2. Fig. 4 is a detailed view of the actuating lever and the segmental gear forming a part thereof.

Referring now more particularly to the drawings, A designates the front axle of an automobile or other vehicle, to the rear side of which are bolted or otherwise rigidly secured a pair of parallel angle bars B, B. The angle bars B, B may be secured directly to the rear side of the front axle but the transverse portions thereof are preferably connected by a stay plate B', which serves to maintain the angle plates in their proper relation, the bolts which secure the transverse portions of the angle bars to the stay plate also constituting a means for securing said bars and stay plate to the front axle of the vehicle. Rotatably supported in the longitudinally disposed portions of the angle bars B, B is a steering rod C which extends transversely of the body of the vehicle. The steering rod C has formed thereon a coarse flat thread $c$ and is provided at the ends thereof with short threaded portions $c'$ for a purpose to be hereinafter set forth.

D designates a nut which is fitted onto the threaded portion $c$ of the steering rod C, said nut being of a length to just fit between the longitudinally extending walls of the angle bars B, B, said walls thereby serving to prevent endwise movement of the nut. The exterior of the nut D is cylindrical in form and is provided at one end thereof with a small pinion E. Loosely mounted upon the exterior of the nut D directly along side of the pinion E carried thereby, is a large pinion F, and secured to or formed integral with the pinion F so as to rotate therewith is a small pinion F' of the same size as the small pinion E, heretofore described. Fixedly secured in the longitudinally disposed walls of the angle bars B, B and extending parallel to the steering rod C is a shaft G upon which is mounted a large pinion H of the same size as the pinion F heretofore described, which meshes with the small pinion E carried by the nut D, said pinion having secured thereto or formed integral therewith a small pinion H', which is of the same size as the small pinion E heretofore described and which meshes with the large pinion F, which is loosely mounted upon the nut D. Loosely mounted upon the fixed shaft G directly along side of the small pinion H', is a large pinion I which meshes with the small pinion F' heretofore described. Carried by the pinion I so as to rotate therewith, is a small pinion I' of the same size as the pinion E carried by the nut D. Loosely mounted on the nut D directly along side of the pinion F' is a lever K, the inner end of which is provided with a segmental gear K' which meshes with the pinion I' loosely mounted on the shaft G. The segmental gear K' is formed on the arc of a circle of the same diameter as the large gears or pinions F, H and I heretofore referred to and the length of the segmental gear is slightly less than a half circle, the depressions after the end teeth of the segmental gear being made shallower than the depressions between said teeth in order to limit the extent of movement of the lever so that the same cannot be passed through an arc of 180°.

From the construction heretofore described, it will be apparent that when the lever K is actuated, motion will be imparted to the small pinion I', and through the large pinion I which travels with the pinion I' to the small pinion F' mounted on the nut D and through the large pinion F which travels with the small pinion F' to the small pinion H' on the shaft G, and through the large pinion H which rotates with the pinion H' to the small pinion E carried by the nut D, so that a very slight movement of the lever K will cause a considerable amount of rotation of the nut D and hence impart to the steering rod C a considerable amount of longitudinal movement, so that a very slight motion of the steering wheel or lever, which is adapted to be suitably connected to the lever K, will suffice to change the course in steering as much as is desired.

The threaded portions $c'$ at the ends of the steering rod C are threaded into lugs L, L, the outer ends of which are provided with horizontally disposed ears which fit between and are pivotally connected to bifurcated portions $m$ formed in the end of lugs M, the outer ends of which are provided with oppositely threaded recesses therein.

N, N designate the levers that extend from the steering spindles of the wheels and by which the wheels are adapted to be shifted in the usual manner, said levers having their outer ends preferably connected by a connecting rod N' so that the steering axles will be turned in unison.

O, O designate a pair of links, the outer ends of which are provided with bifurcated arms, the ends of which are pivotally connected to the levers N, N and the inner ends of which are provided with cylindrical portions $o, o$ oppositely threaded upon the interior thereof.

P, P designates a pair of connecting rods provided with oppositely threaded portions upon the ends thereof. The inner ends of the connecting rods P, P are adapted to be threaded into the threaded recesses in the ends of the lug M, while the outer ends of said rods are adapted to be threaded into the cylindrical portions $o, o$ of the links O, O. As the connecting rods P, P are provided at the ends thereof with oppositely threaded portions, it will be seen that by turning the rods, the device may be readily adjusted to take up wear or to obtain the proper fit between the parts when the same is applied to the vehicle in the first instance.

Q designates a link, the inner end of which is pivotally attached to the free end of the lever K and the outer end of which is provided with an eye positioned at right angles to the plane of the body portion of the link. Pivotally connected to the eye at the outer end of the link Q is a bifurcated lug R, the outer end of which is provided with a threaded recess therein into which is threaded one end of a connecting rod S, the other end of which is connected in any suitable manner to a lever at the lower ends of the usual steering pillar or post.

As the levers of the steering axles are preferably connected by a suitable connecting rod N', it will be seen that only one end of the steering rod need be connected to one of the levers, but I prefer to employ two connected rods, as heretofore described, extending from the ends of the reciprocating steering rod to the levers of both of the steering rods, so that in the event that either of said connecting rods or the connecting rod which directly connects the levers should break, the steering gear would still be operative.

While a convenient embodiment of the invention is illustrated in the accompanying drawings, it will be understood that many changes may be made as to the form and construction therein shown without departing from the spirit of the invention as defined in the appended claims.

I claim:

1. In a steering gear, a threaded reciprocating rod, a nut engaging said rod, means for holding said nut against longitudinal movement, a shaft extending parallel to said threaded rod, a train of gears interposed between said shaft and the nut, and means for actuating said gears.

2. In a steering gear, a frame comprising parallel bars, a threaded steering rod mounted in said bars and extending transversely thereof, a nut engaging said steering rod and positioned between the side bars of the frame with its ends lying alongside the inner faces thereof, a shaft supported in said bars and extending parallel to said threaded steering rod, and a train of gears interposed between said shaft and the nut on the threaded rod.

3. In a steering gear, a threaded rod, a nut engaging said rod, said nut being in the form of a sleeve having a gear secured thereto, an actuating member loosely mounted on said sleeve, and gearing connecting said actuating member and the gear secured to the sleeve.

4. In a steering gear, a threaded rod, a nut engaging said rod, said nut being in the form of a sleeve provided with a fixed gear, an actuating gear loosely mounted on said sleeve, and multiplying gearing connecting said actuating gear and the gear fixed on the sleeve.

5. In a steering gear, a frame, a threaded rod mounted to reciprocate therein, a nut engaging said threaded rod, said nut being in the form of a sleeve and provided with a fixed gear thereon, a fixed shaft mounted in the frame and extending parallel with said threaded rod, a gear loosely mounted on said fixed shaft, an actuating gear loosely mounted on the sleeve and meshing with the gear on the fixed shaft, and gearing between the gear on the fixed shaft and the gear carried by the sleeve.

6. In a steering gear, a frame, a threaded rod mounted to reciprocate therein, a nut engaging said threaded rod and provided with a gear thereon, a double gear comprising large and small gear wheels loosely mounted on said nut, a fixed shaft secured in the frame and extending parallel to the threaded rod, a pair of double gears loosely mounted on said fixed shaft each of said double gears comprising a large gear and a small gear, the large gears of said double gears meshing with the gear carried by the nut and with the small gear of the double gear mounted on the nut and the small gear of one of said double gears on the fixed shaft meshing with the large gear of the double gear on the nut, and an actuating gear loosely mounted on the nut and engaging the small gear of the other double gear on the fixed shaft.

7. In a steering gear, the combination with the pivoted steering axles and their actuating levers, a connecting rod directly connecting said levers, a reciprocating steering bar, and connecting rods extending from said steering bar to said levers.

In testimony whereof I affix my signature in presence of two witnesses.

JAMES R. WALKER.

Witnesses:
 JOHN R. BRENNAN,
 EMMET L. ROSECRANS.